Oct. 27, 1936.  V. SPINETTE  2,058,524
TUNNEL OVEN FOR COOKING PRODUCTS BY INDIRECT HEATING
Filed July 21, 1933  4 Sheets-Sheet 4
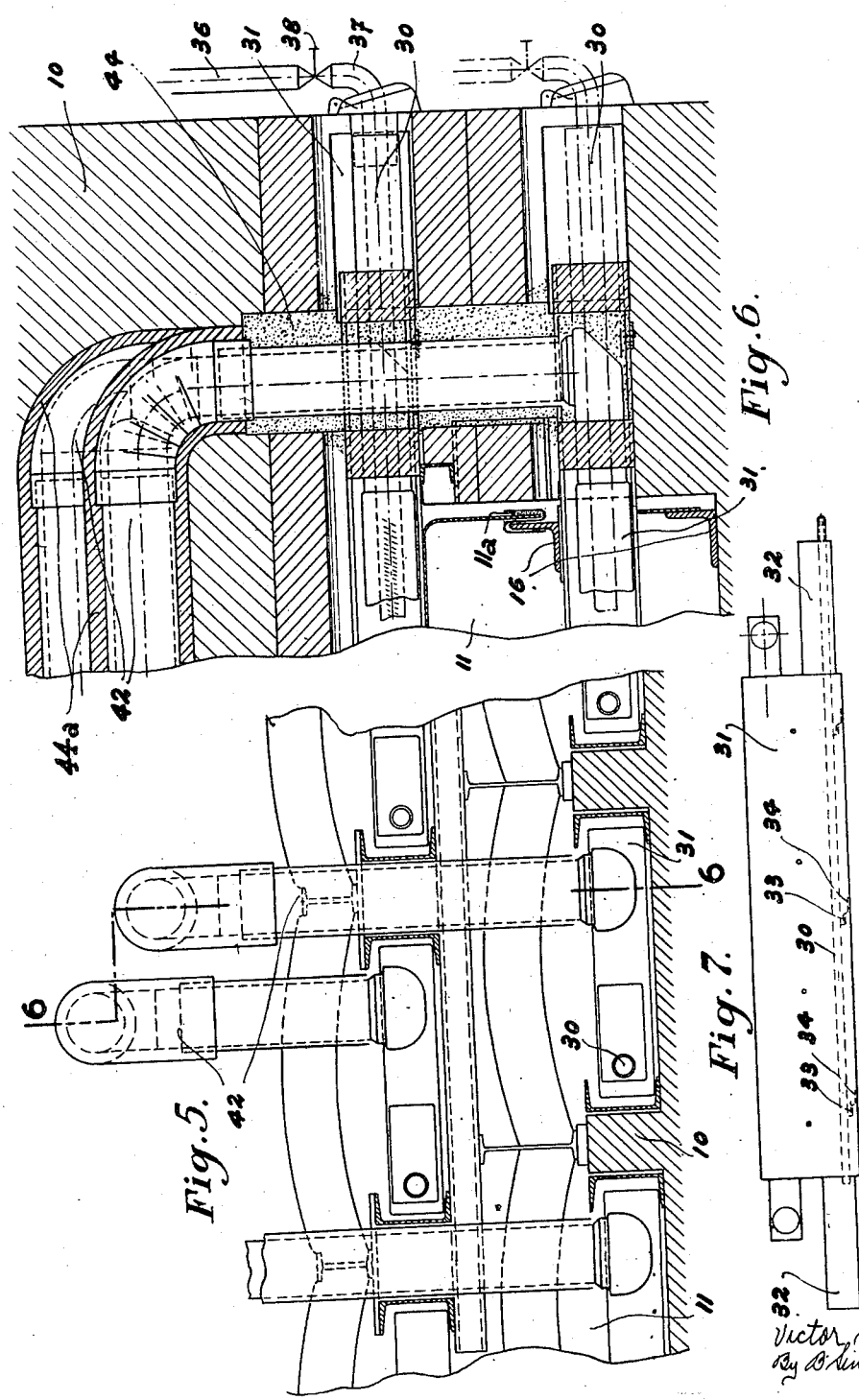

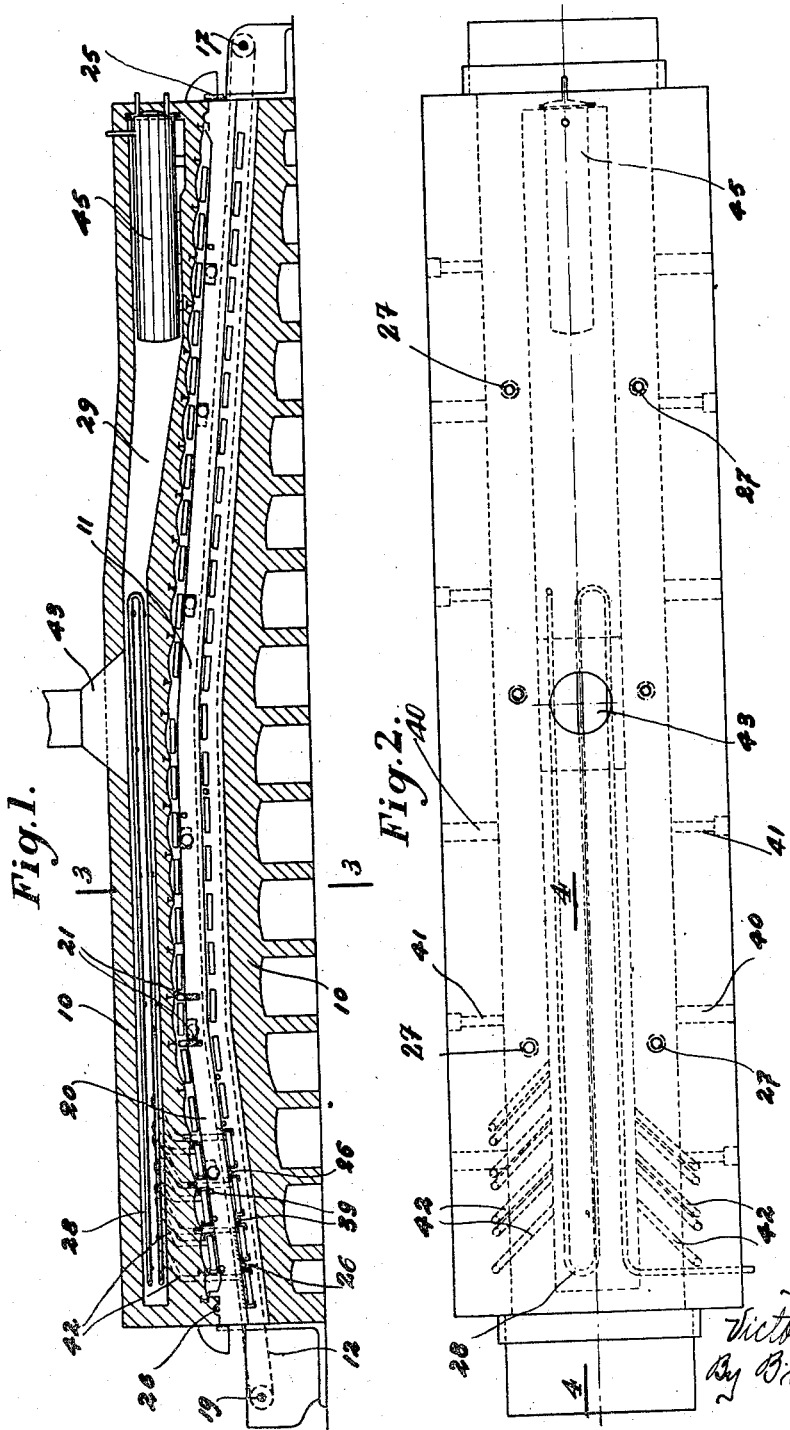

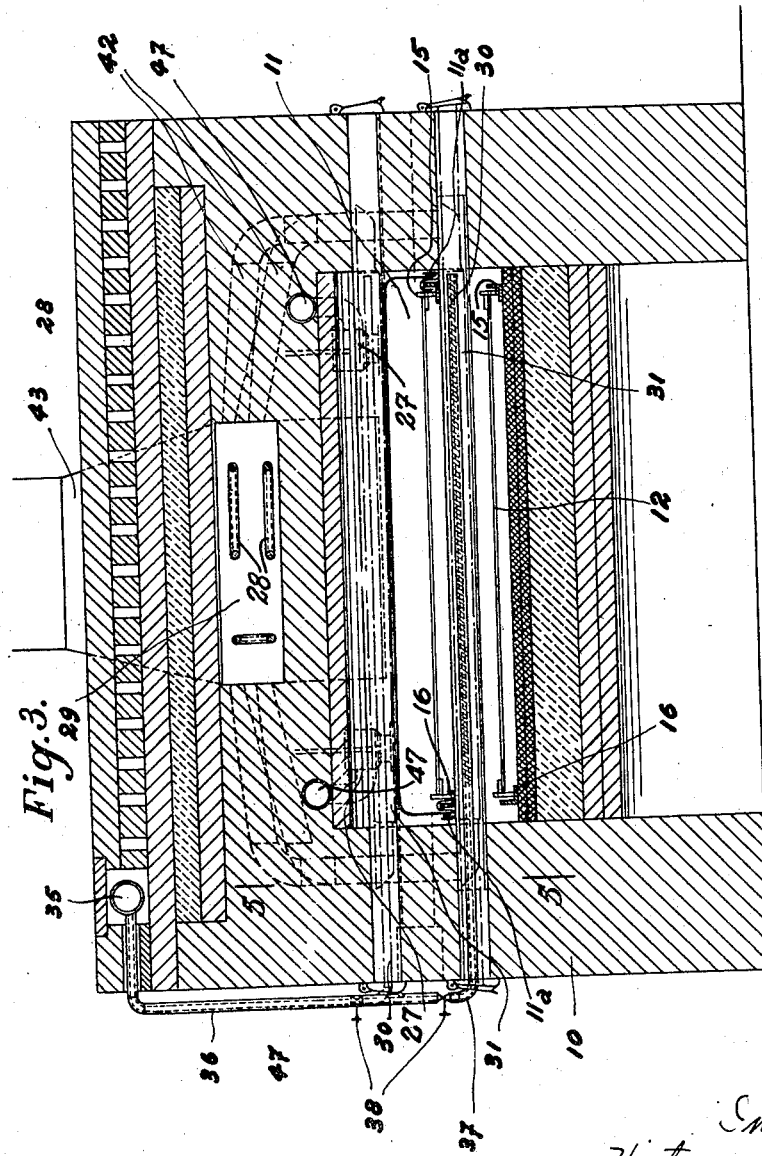

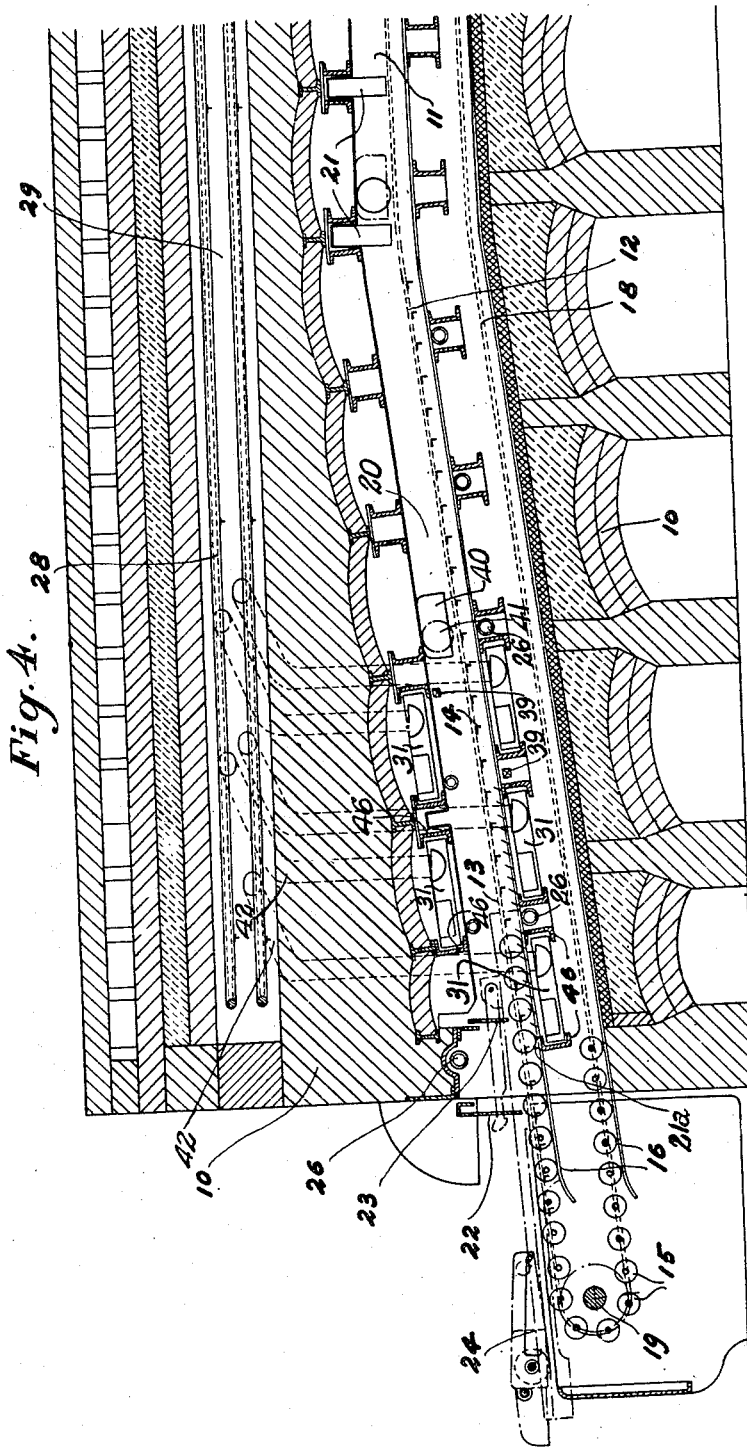

Patented Oct. 27, 1936

2,058,524

UNITED STATES PATENT OFFICE 2,058,524

TUNNEL OVEN FOR COOKING PRODUCTS BY INDIRECT HEATING

Victor Spinette, Brussels, Belgium

Application July 21, 1933, Serial No. 681,611
In Belgium July 22, 1932

5 Claims. (Cl. 107—57)

This invention relates to tunnel ovens for cooking products by indirect heating, and more particularly for cooking food products such as biscuits, loaves of bread of all sizes and small bakers' and confectionery goods.

The object of the invention is to provide certain improvements which will hereinafter appear, in tunnel ovens of this type.

According to the invention, there is provided a tunnel oven for cooking products by indirect heating, characterized by means for injecting steam or vapour around the products to be cooked, this injection taking place at the commencement of cooking of the products and operating to produce by condensation a gloss on the products, means for keeping the injected steam or vapor in the front part only of the cooking chamber of the oven (for example a suitable oven section), an air-lock door at the charging end of the cooking chamber and one or more baffles located within the said chamber and while permitting free passage past them of the loaves or other products as these travel through the oven serving to prevent the passage at the same time of the steam.

The invention includes an hermetically sealed oven completely armoured by metallic walls and preferably arranged in a mono-block masonry setting, the cooking chamber within the oven being of hog-back shape so that its charging end is situated at a higher level than that of the discharge end.

The invention further includes an improved construction of tunnel oven as above, wherein the armouring is airtight and extends over the whole of the length of the oven or over a portion of said length and is constituted by a succession of compartments built of sheet metal and capable of free expansion under heat, the lower edges of the side walls of said compartments dipping into gutters filled with fine sand or an equivalent sealing medium.

The invention further comprises the employment in the improved oven of an endless conveyor for the goods to be cooked, the said conveyor being movable through the cooking chamber of the oven from the charging end thereof to the discharge end and being composed of an endless series of juxtaposed plates of metal or refractory material appropriately linked together and supported through the medium of rollers or runners upon guiding rails extending through the cooking chamber and following the hog-back contour thereof, the speed of the conveyor being appropriately regulated as required according to the type of products under treatment or the character of the treatment to be applied thereto, by suitable speed adjusting mechanism.

Other features of novelty will appear from the following detailed description of one preferred embodiment of the invention which will now be given with reference to the accompanying drawings and purely by way of example. In the said drawings:—

Figure 1 is a longitudinal section of a tunnel oven constructed in accordance with the invention;

Figure 2 is a plan view of the oven;

Figure 3 is a transverse section through the oven taken on the section line 3—3 of Figure 1 and drawn on a larger scale than that figure;

Figure 4 is a longitudinal section through the oven taken along the section line 4—4 of Figure 2 and also drawn on a larger scale than Figures 1 and 2;

Figure 5 is a view in longitudinal section on the section line 5—5 of Figure 3 of one side of the interior of the oven;

Figure 6 is a transverse section through the oven taken on the section line 6—6 of Figure 5; and Figure 7 is a plan view of a heating element incorporated in the oven.

Like reference characters indicate like parts in the various figures.

Referring to the drawings, 10 represents the base of the oven, which rests as shown upon arches or may be arranged to rest upon any other suitable form of support permitting the free circulation of air underneath the hog-shaped muffle or cooking chamber 11.

The products to be cooked are placed upon an endless conveyor 12 to which is imparted a continuous motion through the muffle at the speed appropriate to the treatment of the loaves or other products to be cooked.

The said conveyor is composed either of a series of relatively narrow steel sheets 13 each reinforced by an L-iron 14 or by any other suitable reinforcing means. Alternatively, the conveyor may be composed of plates of refractory clay or like material. The plates 13 rest through the intermediary of rollers or runners 15 upon supporting and guiding rails 16 extending through the oven from end to end thereof and following as to their profile the general hog-back contour of the cooking chamber.

The rising slope of this hog-back path of the products must not be unduly accentuated; otherwise the loaves or other products will tend to slide off the conveyor.

The movement of the conveyor is effected by an operating shaft 17 by means of steel chains 18, while the tension of the conveyor is regulated by adjustment of a tensioning shaft 19.

As the time during which the goods remain in the oven depends essentially upon the nature of the goods which in turn may vary widely, the oven incorporates means for regulating the speed of the shaft 17 and consequently of that of the driving chains 18. This regulating means may take any convenient form as will be understood.

It may be remarked that owing to the use of rollers such as the rollers 15, there is a substantial absence of frictional resistance to the travel of the conveyor with the loaves or other products upon it through the oven and at the same time the operation of the conveyor is more or less silent and free from vibration.

The muffle 11 comprises a sealed steam chamber 20 situated at the charging end of the oven. This chamber is closed at the rear by baffles 21 and in front by two doors 22, 23 arranged one to close while the other opens so as together to constitute an air-lock preventing the establishment of direct communication between the interior of the steam chamber 20 and the external atmosphere.

The products may be arranged in front in successive and equidistant rows upon the conveyor 12 between the doors 22, 23 by means of an automatic charging device 24.

The sealing of the steam chamber 20 permits the injection of steam or moisture and this moisture or steam is retained in the chamber due to the hog-back shape of the muffle and to the fact that the discharge door 25 at the opposite end of the oven is situated at a level appreciably below that of the charging door 22. By this means there is an avoidance of any attraction of the steam or water vapor injected into the chamber towards the said discharge door 25. Also any escape of steam below the conveyor 12 is rendered impossible by a mechanical curtain 21a constituted by a metallic or similar brush over and in contact with which the plates 13 of the conveyor move.

The introduction of the steam, which may be generated in any convenient form of boiler, is effected by means of injectors 26 located both above and below the loaves or other products in position upon the conveyor. The glossing of the loaves resulting from the condensation of the moisture on the dough still comparatively cold, will thus be produced over the whole surface of the loaves—a result which has been impossible to produce hitherto in the usual continuously operating ovens.

The vapors or other emanations arising from the baking of the products, as also the steam, may at any time be evacuated as necessary from the interior of the oven by means of valves 27 provided in a desired number and opening preferably into an evacuation conduit 47 of refractory material.

The muffle 11 is completely lined with metallic surfaces which constitute a sealed armoring for the interior of the cooking chamber. This armoring extends over the whole or a part of the length of the oven and is constituted by a succession of metal plate compartments, the walls of which are capable of freely expanding under the effect of temperature changes and dip at their lower edges into gutters or channels 11a filled with fine sand. The metal walls of the compartments may be connected together by any convenient securing means, for example by soldering.

Owing to the use of a system of indirect heating which will be described below, the products of combustion cannot penetrate into the muffle or in any way contaminate the loaves or other baking products.

The emanations arising from the baking of the farinaceous products will remain perfectly pure. As they always contain a certain amount of alcoholic vapor due to the partial distillation of the farinaceous products, the said emanations may be collected in a single conduit of metal inert to the emanations, the said conduit leading to a suitable distillation plant.

As already described, the oven is provided with a system of indirect heating permitting the independent heating of the conveyor plates and the top of the muffle.

The heating means to this end comprises a double series of Bunsen type burners disposed along the bottom of the muffle and also along the roof or crown. Each burner is constituted by a set of jets 30 provided in a rectangular tube or compartment 31 in metal plate provided with lateral extensions 32, the dimensions and discharge orifices of the jets being specially calculated to give perfect and continuous combustion of the gas fuel. The sets of jets 30 are constituted by plain metallic tubes provided with a series of outlet orifices for the gas. In practice these orifices are formed by simple saw-cuts made by means of a circular saw in the tubes. The tubes are held in position in the compartments 31 by means of hooks 33 engaging in fasteners 34 fixed on one end of the lateral surfaces of the rectangular compartments 31. The fitting into position and the removal of the row of jets thus takes place very easily and without any dismantling, throught the extensions 32.

The gas is supplied to the jets through the main pipe 35 extending over the whole length of the oven. The supply of each set of jets 30 is by way of a pipe 36 which may be connected to the set of jets by a flexible tube 37, the provision of which permits free expansion of the tube constituting the set of jets. The supply of gas to the jets may be adjusted independently for each set of jets by means of a cock 38 provided on each pipe 36, thus permitting regulation with great precision of the temperature of each part of the oven independently of its neighbouring part.

The temperature of the various parts of the oven may be indicated by means of pyrometers 39 provided at certain points along the muffle.

Draught openings and windows 41 are arranged opposite each other as shown, the draught openings being marked 40, and the windows 41 being provided to enable samples of the baking products under treatment to be taken out of the oven when required and further to enable the interior of the oven to be viewed. The oven is preferably illuminated by lamps situated within the cooking chamber. A comparison between the condition of the samples taken and the temperature indicated by the pyrometers 39 will permit of regulating with great precision the supply of gas to each of the sets of jets 30 by means of the controlling cocks therefor 38 with a view to obtaining a highly regular course of baking suited to each class of goods dealt with in the oven.

It follows that the sole and top or crown portions of the ovens may be heated to different temperatures. This is particularly desirable in the case of certain products as will be understood.

Moreover, owing to the method of heating provided and employed according to the present invention the oven is of great elasticity of heating capacity, that is to say, its temperature may be modified in an extremely short time and may be brought very rapidly to the temperature requisite for baking even after the oven has cooled completely down to normal temperature.

Furthermore, it should be noted that it is not necessary to use for the heating of the oven a gas which is perfectly purified, although the use of such a gas is advisable. The gas may nevertheless vary both in quality and in pressure without altering the arrangement of lighting the sets of jets. The jets need not be provided with sparking plugs or like ignition means and do not require the use of magnetos or dynamos. Consequently, the invention permits of enhanced simplicity of construction and arrangement of the heating means.

In addition the sets of jets and the Bunsen burners, as also the piping, which is all of large diameter as shown, do not require troublesome upkeep. Consequently, the improved oven may be run under best conditions by a staff not specialized, which fact considerably reduces the labour costs for operating the oven as compared with those involved in the use of the known ovens of the same type.

The evacuation of the products of combustion from the interior of the oven is effectuated by means of discharge pipes 42 which lead the fumes from the compartments 31 towards the duct 29 from whence they are discharged through a chimney 43.

In the case where the lateral sides of the oven are in masonry, these pipes 43 are made of metal plate and are composed of a vertical part connected by an elbow to a sloping part which opens at an inclination to the said duct 29. The tubes 42 are arranged in a protecting tube surrounded at its lower part by a sand joint or seal 44. This mass of sand serves to permit the free expansion play of the tubes with respect to the masonry of the oven in which they are embedded. Unequal expansions therefore of the tubes and masonry is prevented from giving rise to defects in the operation of the oven. Over the rest of its course, the protecting tube serves as a covering for a sheath of concrete 44a.

The greater part of the calories still contained in the products of combustion when they enter the duct 29 are again recuperated in this duct. The heat represented by these residual calories is absorbed on the one hand by a coil 28 which produces steam at one kilogram pressure and adapted to be used for heating the fermentation chest of the plant for example, and on the other hand by a boiler 45 fitted in the duct 29. In this way the loss of heat through the chimney 43 is reduced to a minimum.

Among the essential features of the invention there may be mentioned the feature that for certain cases the special fixing of the tubes 31 in order to render them removable. The tubes 31 constitute hermetically sealed compartments in metal plate which are supported by U-girders 46 arranged transversely of the oven. The compartments 31 are simply slid on the lower webs of the said girders 46 so that they may at any time be dismantled without it being necessary to take down the masonry of the oven.

What I claim and desire to secure by Letters Patent of the United States is:—

1. A tunnel oven of the class comprising a muffle, an endless conveyor for advancing the products to be baked through the muffle, and heating elements disposed outside the muffle and transversely thereto, each of the heating elements consisting of a sheet metal casing having a flat wall directed towards the muffle and extending over the entire width of the muffle, and a burner pipe in the interior of said casing from one end to the other adjacent said wall directed towards the muffle, a regulable supply pipe connected with each of the burner pipes, extensions at the end of the casing, and conduits communicating with said extensions and adapted to carry off the products of combustion from said casing.

2. A tunnel oven of the class described, comprising in combination a muffle, an endless conveyor for advancing the products to be baked through the muffle, and heating elements disposed outside of and transversely with respect to said muffle, each of the heating elements being formed by a sheet metal casing having a flat wall directed towards the muffle, a burner pipe located in said casing and extending from one end of the casing to the other and having openings for the discharge of the flame, extensions projecting from the ends of the casing, in which extensions the burner pipe is supported, a supply pipe attached to the end of the burner pipe projecting from one of said extensions, and additional extensions on the casing and conduits communicating with said last named extensions and adapted to carry off the products of combustion from each casing.

3. A tunnel oven of the class described comprising in combination a muffle, an endless conveyor for advancing the products to be baked through said muffle, and heating elements disposed outside of and transversely with respect to said muffle, each of said heating elements being formed by a sheet metal casing of substantially rectangular cross-section having a flat wall directed towards the muffle, burner pipes extending longitudinally through said casings adjacent the wall directed towards the muffle, and transverse beams arranged in pairs transversely of the oven, said sheet metal casings being slidably and removably supported on said transverse beams.

4. A tunnel oven of the class described, comprising in combination a muffle, an endless conveyor for advancing the products to be baked through said oven and heating elements disposed outside of and transversely with respect to said muffle, each heating element formed of a sheet metal casing of substantially rectangular cross-section and having a flat wall directed towards the muffle, a burner pipe in each sheet metal casing extending longitudinally thereof over the entire length of the muffle adjacent the wall directed towards the muffle, said burner pipe being equipped with a plurality of slits permitting the issuance of a flame over a multiplicity of points distributed over the length of the burner pipe, extensions projecting from the end walls of the casing and containing end portions of the burner pipe, the lateral wall of the oven structure being provided with openings for receiving said extensions, removable supply pipes communicating with one end of the burner pipes projecting from the extension, and additional extensions at the end walls of the casing, and conduits located in the oven outside the space of the muffle of the same for carrying off the products of combustion from the casing.

5. A tunnel oven of the class described, comprising in combination a muffle, an endless conveyor for advancing the products to be baked through said oven, and heating elements disposed outside of and transversely with respect to said muffle, said heating elements being serially alined over the entire length of the muffle and transversely thereto, each of the heating elements comprising a casing of sheet metal of substantially rectangular cross-section having a flat wall directed towards the muffle, one group of heating elements being disposed above the muffle and another group of heating elements being disposed below the path of products carried by the conveyor through the muffle, each casing containing a burner pipe having a plurality of outlets distributed over the entire length, said burner pipe extending from one end of the casing to the other and projecting through the ends, the end walls of the casing being provided with extensions in which end portions of the burner pipes are located, and a plurality of supports transversely of the path of the products to be carried and above and below said path, said supports being arranged in pairs, each pair adapted to support slidably and removably one of the burner casings, the pairs of supports being spaced from each other a relatively short distance only to extend the series of casings of sheet metal over the entire length of the path traveled by the products to be baked.

VICTOR SPINETTE.